(12) United States Patent
Carvalho Da Silva et al.

(10) Patent No.: US 11,833,900 B2
(45) Date of Patent: Dec. 5, 2023

(54) MULTI-FUNCTIONAL COMPOSITE STRUCTURE AND PROCESS OF ITS PRODUCTION

(71) Applicant: TMG—Tecidos Plastificados e Outros Revestimentos Para a Indústria Autómovel, S.A., V.N. Famalicão (PT)

(72) Inventors: Luis Filipe Carvalho Da Silva, Vila Nova de Famalicã (PT); Tiago Filipe Da Silva Maia, Vila Nova de Famalicã (PT); Antonio Cesar Rodrigues Aguia, Vila Nova de Famalicã (PT); Elizabete De Pinho, Vila Nova de Famalicã (PT)

(73) Assignee: TMG—Tecidos Plastificados e Outros Revestimentos Para a Indústria Automóvel, S.A., V.N. Famalicão (PT)

(*) Notice: Subject to any disclaimer, the term of this patent is extended or adjusted under 35 U.S.C. 154(b) by 339 days.

(21) Appl. No.: 17/056,430

(22) PCT Filed: May 14, 2019

(86) PCT No.: PCT/EP2019/062371
§ 371 (c)(1),
(2) Date: Nov. 18, 2020

(87) PCT Pub. No.: WO2019/228792
PCT Pub. Date: Dec. 5, 2019

(65) Prior Publication Data
US 2021/0206267 A1 Jul. 8, 2021

(30) Foreign Application Priority Data
May 29, 2018 (EP) .................................. 18174745

(51) Int. Cl.
*B60K 35/00* (2006.01)
*B60K 5/00* (2006.01)
(Continued)

(52) U.S. Cl.
CPC .................. *B60K 5/00* (2013.01); *B41M 1/12* (2013.01); *B41M 5/0047* (2013.01); *B60K 37/02* (2013.01);
(Continued)

(58) Field of Classification Search
CPC .............................. B60K 35/00; B60K 37/02; B60K 2370/1446; B60K 2370/28; B41M 1/12; B41M 5/0047
(Continued)

(56) References Cited

U.S. PATENT DOCUMENTS 9,998,118 B2   6/2018  Gerken et al.
10,452,257 B2  10/2019 Kim et al.
(Continued)

FOREIGN PATENT DOCUMENTS

EP   3051022 A1   8/2016
EP   3053778 A1   8/2016
EP   3088156 A1   11/2016

*Primary Examiner* — Andrew J Coughlin
*Assistant Examiner* — Hana S Featherly
(74) *Attorney, Agent, or Firm* — Duane Morris LLP

(57) ABSTRACT

The present invention provides a composite structure comprising a translucent layer (1) having a light transmittance of 1 to 50%, an opaque layer (2) containing a translucent area (6), and a touch sensor area (5) that is at least partly arranged in or above or below the translucent area of layer (2). The present invention also provides a method of producing the composite structure. The composite structure can be used to replace conventional buttons in motor vehicles.

12 Claims, 7 Drawing Sheets

(51) Int. Cl.
  *B41M 1/12*    (2006.01)
  *B41M 5/00*    (2006.01)
  *B60K 37/02*   (2006.01)

(52) U.S. Cl.
  CPC .. *B60K 2370/1446* (2019.05); *B60K 2370/28* (2019.05)

(58) Field of Classification Search
  USPC ..................................................... 362/23.04
  See application file for complete search history.

(56) References Cited

U.S. PATENT DOCUMENTS

| | | |
|---|---|---|
| 10,562,446 B2 | 2/2020 | Cannon |
| 10,701,801 B2 | 6/2020 | Osorio Dinis et al. |
| 2007/0031161 A1 | 2/2007 | Iandoli et al. |
| 2010/0079153 A1 | 4/2010 | Maloof et al. |
| 2013/0248344 A1 | 9/2013 | Stilwell |
| 2016/0214525 A1* | 7/2016 | Sheehan ................ E05B 81/08 |
| 2016/0221498 A1 | 8/2016 | Vourlat |
| 2017/0139506 A1 | 5/2017 | Rodriguez et al. |
| 2017/0269774 A1 | 9/2017 | Ben Abdelaziz |
| 2018/0037174 A1 | 2/2018 | Seegers et al. |

\* cited by examiner

Without backlight

With backlight

MULTI-FUNCTIONAL COMPOSITE STRUCTURE AND PROCESS OF ITS PRODUCTION

FIELD OF THE INVENTION

The present invention relates to a composite structure comprising a translucent layer (1) having a light transmittance of 1 to 50%, an opaque layer (2) containing a translucent area (6), and a touch sensor area (5) that is at least partly arranged in or above or below the translucent area of layer (2). The present invention also provides a method of producing the composite structure. The composite structure can be used to replace conventional buttons in motor vehicles.

BACKGROUND ART

EP 3 088 156 A1 describes a method for producing an illuminable attachment area for a motor vehicle, wherein a light transmitting sheet with a mask layer, opaque except for at least one transmitting area, is coated with such a design that allows light transmitting only in a predetermined proportion of the foil. The advantage of this invention lies in the fact that a foil is provided which is back-moulded in the coated state with a carrier.

EP 3 053 778 A1 describes a decorative assembly comprising a luminous support made up by a lighting device which consists in a distributed light source comprising at least one LED and a light guide and a support that supports and connects the assembly to the vehicle interior; and a decorative covering having an opaque appearance which additionally comprises a mask that allows the motif to be defined in a sharp manner.

EP 3 051 022 A1 relates to an artificial leather comprising a textile carrier material, a light-transmitting layer structure arranged on and connected to the textile carrier material with at least one layer based on polyurethane or polyvinyl chloride, and a surface finish on the layer structure, wherein the artificial leather has a low visible light transmittance.

EP 3 072 743 A1 relates to an interior lining part for a motor vehicle, comprising a translucent support having a front and a back, a translucent cover selected from a TPO, TPU, TPE, PO or PVC film on the front of the carrier component and a light source at the back of the support member, wherein the composite of the carrier and the translucent cover has a low light transmittance in the visible wavelength range.

These prior art documents do not disclose an interior lining part having functionalities other than lighting.

On the other hand, WO 2015188955 A1 discloses a flexible sheet made of a conductive polymeric material, which has functional surface-area regions designed in the form of a switching, sensor or operating element.

WO 2016198969 A1 discloses a flexible textile structure with sensing and lighting capabilities without losing the principal features of a typical textile, such as comfort, seamless and mechanical flexibility. Sensing applications include a directly printed self-capacitive sensor, a knitted textile sensor and the integration of temperature/humidity bulk capacitive sensor directly on the textile. Lighting applications for decorative and signage purposes include an electroluminescent sensing device and the use of a hybrid sensor associating a Surface Mount Device Light Emitting Diodes (SMD LEDs) and a printed self-capacitive sensor.

These prior art documents do not disclose the use of translucent layers hiding the functional regions.

PROBLEM TO BE SOLVED BY THE INVENTION

The prior art does not disclose the replacement of conventional buttons with a system using an interior lining assembly. In particular, the prior art does not disclose a system using touch sensors in which the regions containing the touch sensors and other functional parts are covered by a layer having low light transmittance.

Therefore, the problems underlying the present invention were to provide a structure having a seamless surface and containing touch sensors that may be hidden unless illuminated, and to provide an improved process for the production of such a structure. The structure may be used as an assembly in motor vehicles to replace conventional buttons.

SUMMARY OF THE INVENTION

The problems underlying the present invention were solved by providing the composite structure and the production process defined in the claims.

The subject-matter of the present application is the following.

[1] A composite structure comprising a translucent layer (1) having a light transmittance of 1 to 50%, an opaque layer (2) containing a translucent area (6), and a touch sensor area (5) that is at least partly arranged in or above or below the translucent area (6) of the opaque layer (2).

In one embodiment of [1], the composite structure comprises a translucent layer (1) having a light transmittance of 1 to 30% and covering an opaque layer (2) and a touch sensor area (5), wherein the opaque layer (2) contains a translucent area (6) and the touch sensor area (5) is at least partly arranged in or above or below the translucent area (6) of the opaque layer (2).

The following embodiment of [1] is preferred: A composite structure comprising a translucent layer (1) having a light transmittance of 1 to 50%, an opaque layer (2) containing a translucent area (6), and a touch sensor (11) fully arranged in or below the opaque area of layer (2).

The following embodiment of [1] is more preferred: A composite structure comprising a translucent layer (1) having a light transmittance of 1 to 50%, an opaque layer (2) containing a translucent area (6), and a touch sensor area (5), characterized in that the touch sensor area (5) contains a touch sensor (11) fully arranged below the opaque area of layer (2), and a translucent area (12) at least partially arranged below the translucent area (6) of layer (2).

[2] The composite structure according to [1], wherein the opaque layer (2) containing the translucent area (6) is a mask layer.

[3] The composite structure according to [1] or [2], containing a sensor layer (3) comprising the touch sensor area (5) and at least electric conductors connected thereto.

Preferably, the composite structure contains, in this order, the translucent layer (1), the opaque layer (2) containing a translucent area (6), and a sensor layer (3) comprising the touch sensor area (5) and at least electric conductors connected thereto.

[4] The composite structure according to any one of [1] to [3], wherein the touch sensor area (5) contains a touch sensor (11) fully arranged below the opaque area of layer (2), and a translucent area (12) at least partially arranged below the translucent area (6) of layer (2).

[5] The composite structure according to any one of [1] to [4], containing the translucent layer (1), the opaque layer (2) containing a translucent area (6), optionally the sensor layer (3), and a support layer (4) in this order, wherein the support layer (4) is translucent or at least partially translucent.

[6] The composite structure according to any one of [1] to [5], containing a light source (10) arranged in or attached to at least one of the layers selected from the opaque layer (2) containing a translucent area (6), the translucent sensor layer (3), and the support layer (4).

[7] The composite structure according to any one of [1] to [6], comprising a soft layer that is contained in layer (1) below one or more compact layers (7) or that is arranged between layer (1) and layer (2) or between layer (2) or, if present, layer (3) and layer (4).

[8] The composite structure according to any one of [1] to [7], obtainable by a process comprising a step (i) of applying an opaque layer (2) containing a translucent area (6) on a translucent layer (1), and a subsequent step (ii) of applying a translucent touch sensor area (5) or a sensor layer (3) containing it on the translucent layer (1).

[9] The composite structure according to any one [1] to [8], wherein the translucent layer (1) is the front side of the composite structure and is selected to render the other elements of the composite structure invisible in the absence of light emitted from the light source (10) arranged in or at the rear side of the composite structure.

[10] The composite structure according to [9], wherein the translucent elements are selected to allow and the opaque areas are selected to inhibit transmittance of visible light emitted from the light source (10) arranged in or at the rear side of the composite structure.

[11] A process for producing a composite structure described in any one of [1] to [10], comprising a step (i) of applying an opaque layer (2) containing a translucent area (6) on a translucent layer (1) and a step (ii) of applying a translucent touch sensor area (5) or a sensor layer (3) containing it on the translucent layer (1).

[12] The process according to [11], wherein step (ii) is carried out after step (i).

[13] The process according to [11] or [12], wherein steps (i) and (ii) are each a printing step selected from screen printing and ink jet printing.

[14] The process according to any one of [11] to [13], wherein step (i) is printing an opaque mask layer and step (ii) is printing a sensor layer (3). In a preferred embodiment, the sensor layer (3) is printed on the same side of the translucent layer (1) where the opaque mask layer has been printed.

[15] The process according to [11], comprising a step (a) of applying an opaque layer (2) containing a translucent area on a sensor layer (3) and a step (b) of applying the modified sensor layer (3) obtained in step (a) on a translucent layer (1).

ADVANTAGES OF THE INVENTION

The use of the touch sensors in the composite structure of the present invention allows the replacement of conventional buttons, making possible to obtain a structure having a seamless surface.

The composite structure is flexible and soft and may have a grain. The grain may be geometric or may be intended to imitate natural leather.

The composite structure may have the property of making the touch sensors invisible unless the structure is illuminated. Hence, the sensors may be "hidden-until-lit".

These properties of the inventive composite structure allow new and innovative design options.

EMBODIMENTS OF THE INVENTION

Figure 1A:
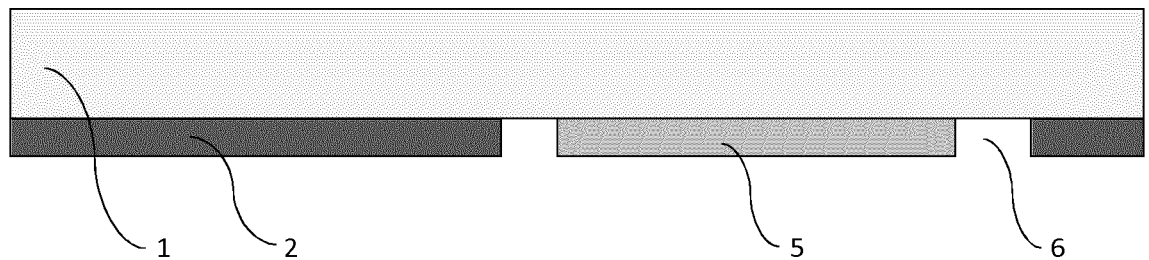
FIG. 1A shows a composite structure of the present invention, containing a translucent layer (1) and a touch sensor area (5) that is arranged in the translucent area (6) of the opaque layer (2).
Figure 1B:
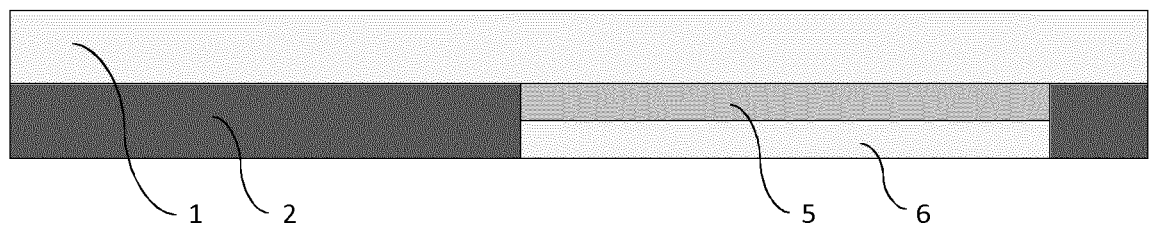
FIG. 1B shows a composite structure of the present invention, containing a translucent layer (1) and a touch sensor area (5) that is arranged above the translucent area (6) of the opaque layer (2).
Figure 1C:
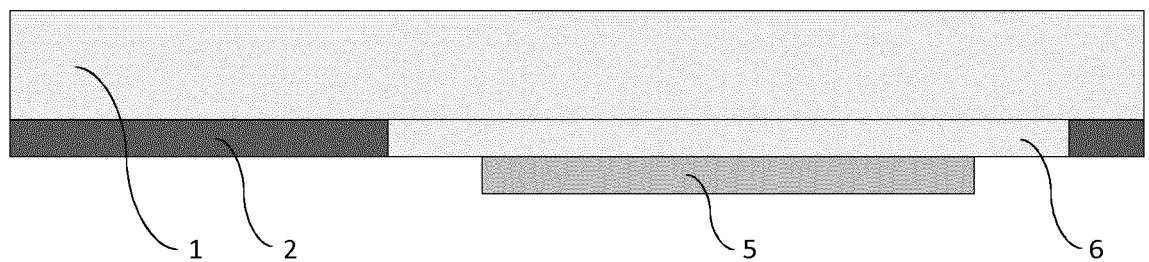
FIG. 1C shows a composite structure of the present invention, containing a translucent layer (1) and a touch sensor area (5) that is arranged below the translucent area (6) of the opaque layer (2).

The composite structure of the present invention preferably has a total thickness of 50 to 20000 µm, more preferably 100 to 5000 µm.

Translucent layer (1) preferably has a thickness of 30 to 3000 µm, more preferably 80 to 1000 µm. Layer (2) preferably has a thickness of 1 to 100 μm, more preferably 2 to 20 μm. Touch sensor area (5) preferably has a thickness of 0.5 to 30 μm, more preferably 1 to 10 μm. Sensor layer (3) preferably has a thickness of 1 to 1000 μm, more preferably 10 to 500 μm. Support layer (4) preferably has a thickness of 10 to 10000 μm, more preferably 100 to 5000 μm.

The composite structure comprises layer structures and is a layer structure itself. The plane of the layer of the composite structure is sometimes referred to as "the layer plane" in the present invention.

The term "layer" in relation to each layer structure described in the present invention means a structure defined by a length x, a width y, and a depth or thickness z. In a layer, the values of x and y are each at least 5 times higher than the value of z, preferably at least 10 times or at least 20 times. The plane of the layer is defined by x and y. In the composite structure of the present invention, the planes of the layers are parallel to each other and the values of x and y are each preferably at least 1 cm, more preferably at least 2 cm, and even more preferably at least 5 cm.

The composite structure may be defined by its visible side, i.e. the upper side of the translucent layer (1) that may have a grain and/or a lacquer layer (9). This side is also referred to as the A-side. The underside is referred to as the B-side. These designations hold for all layers of the composite structure. This means that the side facing the translucent layer is the A-side of a layer, and its rear side is the B-side of a layer. A direction within the same layer plane is referred to as horizontal direction, and a direction from a layer plane to another layer plane, in particular in the direction perpendicular to a layer plane, is referred to as vertical direction within the composite structure.

The terms "above" and "below" relate to positions perpendicular to a layer plane. For instance, a touch sensor area (5) arranged below or above a translucent area (6) is arranged in a position perpendicular to the layer plane of the translucent area.

A "translucent" structure allows the transmittance of more visible light than an "opaque" structure, when light is emitted from the same light source and hits the structures.

In the present invention, the meaning of the term "translucency" covers the meaning of "transparency". In general, transparency is the physical property of allowing light to pass through the material without being scattered. Translucency is a superset of transparency and allows light to pass through and allows scattering. In other words, a translucent medium allows the transport of light while a transparent medium not only allows the transport of light but allows for image formation. Transparent materials appear clear.

Since the value of the light transmittance is affected by absorption, scattering, reflection and the like, the exact light transmittance values of the different components of the composite structure may vary depending on the type of light source, the composition and thickness of the various layers. The light transmittance also differs for different wavelength ranges.

In one embodiment, a translucent structure is defined in that a lighting system, e.g. a light source, having relatively low luminous power such as, e.g., a 0.5 watt LED allows achieving a luminance of the composite structure between 2 and 4 cd/m² (cd=candela) or even between 2 and 5 cd/m² and therefore suitable background lighting, wherein the elements arranged under the translucent layer (1) are imperceptible as long as the lighting system is deactivated. This type of lighting is also referred to as hidden-until-lit.

The various translucent layers of the composite structure may differ in the respective light transmittance. For instance, light transmittance of the composite structure through the translucent areas in perpendicular direction from the B-side to the A-side or from the light source to the A-side, respectively, may be 1 to 50%, preferably 1% to 30%, more preferably 2 to 20% and even more preferably 5 to 10% in the wavelength range of 400 to 700 nm.

A composite structure having the desired light transmittance comprises one of the following combinations of translucent elements:
- layer (1) having layer (2) at its B-side;
- layer (1) having layer (2) and layer (3) in this order at its B-side;
- layer (1) having layer (2), layer (3) and support layer (4) in this order at its B-side.

The opposite property of translucency is opacity. The light transmittance of the opaque portions of the composite structure, i.e. the portions containing the opaque areas of layer (2), may be less than 1%, preferably less than 0.1% and preferably 0%. The values preferably relate to the wavelength range of 400 to 700 nm. In a preferred embodiment, the term "opaque" means a light transmittance of less than 1% in the wavelength range of 400 to 700 nm. In any case, the light transmittance of an opaque layer is lower than the light transmittance of translucent layer (1). For instance, if the light transmittance of translucent layer (1) is at least 2% then the light transmittance of a layer contained in the same composite structure and referred to as "opaque" is less than 2%.

The light transmittance of the composite structure is ultimately defined by the composite of materials, wherein the light transmittance of the translucent layer (1) may be low to achieve the desired property of hiding the other elements when the light source is deactivated, i.e. the other elements are hidden-until lit. When the light source is deactivated, the upper side of the composite structure has the appearance of a conventional structure, e.g. a conventional artificial leather.

To enable the property of hiding the elements arranged under the translucent layer (1), the light transmittance of the translucent layer (1) is preferably 1 to 50%, more preferably 1 to 30%, still more preferably 2 to 20% or 5 to 10% in the wavelength range of 400 to 700 nm.

The light transmittance of the translucent layer (1) may be substantially lower than the light transmittance of the other translucent elements, e.g. by a factor of 10 or more. The other translucent elements may have a light transmittance of up to 100%, i.e. they may even be transparent.

The translucent elements and the light source can be adapted to one another in such a way that a luminance of 1 to 20 cd/m², preferably 2 to 20 cd/m², and more preferably 2 to 10 cd/m² or 2 to 8 cd/m² is achieved.

The light transmittance of the layer structures described in the present application, i.e. the individual layers or any of the composite structures, respectively, is determined as follows: Equipment: Datacolor, model 850; Lamp: Xenon. The total transmittance is measured according to the user's guide provided by the manufacturer. A white plaque (e.g. Spectralon® plaque) is used as an optical standard for transmission calibration and measurement. The white plaque is placed at the front aperture plate. The sample to be measured is placed against the sphere opening. The transmittance is determined within the range of 400 to 700 nm at the wavelength $\lambda_{max}$ of the maximum transmittance peak for the sample. The light transmittance [%] of a sample is defined as 100%×(transmittance value measured at $\lambda_{max}$ in the presence of the layer structure)/(transmittance value measured at $\lambda_{max}$ in the absence of the layer structure).

Materials used for the support layer (4) may have a high light transmittance of up to 90%. Materials used for the translucent layer (1) may have a light transmittance of 1 to 50%. A combination of these materials may result in a light transmittance of 5% to 10% for the composite structure.

Whenever it is mentioned in the context of this description that individual components or elements are based on or made of a certain material, this should be interpreted as the respective material forming the main constituent of the component, wherein other constituents may also be present in small quantities. In embodiments, the terms "based on" or "made of" a certain material means a content of more than 50% by weight, preferably 90% by weight, and more preferably 95% by weight.

It is possible to use mixtures of the cited materials with other materials. It is furthermore possible to use additives, e.g., in the form of a UV stabilizers for preventing erosion and fading, dyes and pigments for designing the exterior appearance or foams for reducing the weight.

In some examples, graphic designs, image, pattern or the like are provided in or on the composite structure. The elements may collectively be referred to as graphic(s) in the present description. For example, decorative patterns or indicative patterns may be applied. The patterns may be colored, e.g. red, to simplify the user's orientation or to draw the user's attention to the illuminated area when the light source is activated.

Examples for applying the graphics are inkjet printing, screen printing, laser printing, laser etching or by means of a paint application with the aid of a mask or the like. Inkjet printing and screen printing are preferred.

It is to be noted that these graphics may be provided on any A-side or B-side of any layer that is illuminated, e.g. any layer that superimposes the light source (10). In particular, graphics may be provided on the B-side of layer (1), on the A-side of the touch sensor area (5), on any side of sensor layer (3) or on any side of layer (4), by printing the graphics onto the surface of said side of the respective layer. Similar to the touch sensor area (5), the graphics are arranged in or below or above the translucent area of layer (2).

In the present description, elements and components are generally described in the singular form, e.g. "a" component or "containing a" component. It is emphasized that these formulations do not at all exclude the presence of more than one of the indicated component or element, unless indicated otherwise.

In the present invention, the standards and norms mentioned refer to the latest version available at the time this application was filed, unless indicated otherwise.

The Translucent Layer (1)

This layer may simply be referred to as "layer (1)".

The light transmittance of layer (1) is 1 to 50%, preferably 1 to 30%, more preferably 2 to 20% and even more preferably 5 to 10% in the wavelength range of 400 to 700 nm.

In an embodiment, layer (1) covers the opaque layer (2), the touch sensor area (5) and the other layers and elements of in the composite structure, except for the lacquer layer (9) which is arranged on top of layer (1) and the grain that is present on the top surface of layer (1).

In another embodiment, layer (1) covers the touch sensor area (5) and the other layers and elements of in the composite structure, except for the opaque layer (2) which is arranged on top of layer (1), and optionally except for the lacquer layer and the grain that may be present on top of layer (2).

Layer (1) may be a single layer or a composite layer structure. It may contain a compact layer structure and may optionally contain a lacquer layer (9) on one side and one or more foam layer(s) (8) on the other side.

In the present invention, a compact layer structure comprises one or more compact layer(s) (7).

In addition, layer (1) may be covered by a lacquer layer (9), i.e. the uppermost layer component at the A-side of layer (1), and/or may have a grained surface structure to imitate natural leather. Additives may be contained in layer (1). Adhesives may be present between structures of layer (1). All these components together may constitute layer (1) and have, as a whole, the desired light transmittance.

The additives contained in the translucent layer (1) may be additives to render it resistant against UV and/or high temperature. Two types of light stabilizers may be used, i.e. Ultraviolet Light Absorbers (UVA) and Hindered-Amine Light Stabilizers (HALS). Several types of UVA are commercially available, e.g. benzotriazoles which offer the broadest spectral coverage. Triazine is also an option. HALS trap free radicals to maintain surface properties such as gloss and prevent cracking and chalking of paints. When combined, UVA and HALS provide synergistic effects and offer simplicity of formulation. In relation to the heat degradation, suitable products are e.g. benzenepropanamide, N,N'-1,6-hexanediylbis[3,5-bis(1,1-dimethylethyl)-4-hydroxy, an antioxidant and tris(2,4-di-tert.-butylphenyl)phosphite.

If a lacquer layer (9) is present, it is part of translucent layer (1) and may contribute to the low light transmittance of layer (1). This means the other layer components of layer (1) may have higher light transmittance than the lacquer layer.

Since the uppermost layer component of layer (1) is frequently touched by the user, it should be selected to have high abrasion resistance. In particular, the lacquer layer (9) as the uppermost layer of layer (1) preferably has high abrasion resistance.

In one embodiment, layer (1) is a single layer, e.g. a translucent foil. It may consist of a film or comprise a film, for example a film consisting of or comprising TPO, TPU, TPE, PO, PVC or combinations thereof. Preferred materials are TPU, TPO or PVC.

In another embodiment, layer (1) contains one or more soft layer(s), preferably one soft layer, and a compact layer structure optionally covered by a lacquer layer (9). In particular, layer (1) may contain a soft layer and two or three compact layers covered by a lacquer layer (9) and having a grain. The soft layer is preferably a foam layer.

In the present invention, a soft layer has a lower Shore A hardness than the compact layer structure of translucent layer (1).

In the present invention, a compact layer has a density of more than 0.80 g/cm$^3$, and a foam layer has a density of less than 0.80 g/cm$^3$.

The compact layer structure of translucent layer (1) preferably contains two or three compact layers. The layers may differ in composition, thickness, translucence and any other property. The compact layer structure has a total thickness of preferably 30 to 2000 μm, more preferably 80 to 1000 μm.

The base raw material of layer (1) preferably has low crystallinity and a low amount of oils in the formulation. The pigments master batch are selected to have the right amount of pigment and a dispersion additive to guarantee a uniform pigment distribution and consequently a uniform colour and transmittance. In order to avoid the degradation of the translucent effect by heat or UV aging over time, additives are preferably added.

The layer contained in translucent layer (1) may have the following preferred thicknesses: lacquer layer (9): 1 to 50 µm, more preferably 2 to 30 µm; compact layer (7): 50 to 1000 µm, more preferably 100 to 500 µm; foam layer (8): 50 to 1000 mm, more preferably 100 to 500 mm. The preferred ranges mentioned are combined in preferred embodiments, and the more preferred ranges mentioned are combined in more preferred embodiments.

Layer (1) can be manufactured in different ways, for example, by means of extrusion, knife coating, injection molding or sintering, vacuum molding, casting or rotational molding and other known processes. The cover material may be smooth or grained to imitate e.g. natural leather. The grain may be produced before, during or after the molding process. The grain contained on the translucent layer to imitate natural leather may have depths of 10 to 1000 µm, preferably 50 to 500 µm. Preferably, the materials are also UV-resistant and heat-resistant.

Graphics mentioned above may be applied to layer (1). In addition, layer (1) may have a structure on its A-side and/or its B-side, wherein the structure is produced when the cover material is molded or by means of subsequent processing such as, for example, laser processing or etching.

Layer (1) is preferably flexible and soft. Preferably, layer (1) has soft haptics such as a Shore A hardness in the range from 60 to 80, for example about 70. The Shore A hardness referred to in the present invention is defined in DIN 53505.

Layer (1) may contain cork particles. Preferred cork particles and methods for producing them and incorporating them into layer structures are described in EP 3 051 022 A1. These particles may be translucent, opaque or fluorescent and may be contained in any one of the layers of layer (1). They may be visible or invisible when the light source is not activated.

The Opaque Layer (2) Containing a Translucent Area (6)

This layer is also referred to as translucent-area containing opaque layer (2) or simply as "layer (2)".

Layer (2) contains a translucent area and an opaque part. The opaque areas may be discontinuous and thus do not have to be connected to each other. The various opaque areas may have different properties such as thickness, translucence, color and the like.

The opaque areas may be large opaque areas and/or relatively thin opaque graphics such as letters, symbols or frames or the like.

Layer (2) may be a coating on another layer, e.g. a paint or a mask, preferably a mask. Preferably, layer (2) is a mask printed on the B-side of layer (1). The printing technique may be laser printing or preferably inkjet or screen printing. The pastes or inks used in the printing method preferably has high adhesion to the substrate material, e.g. the B-side of layer (1).

Figure 2A:
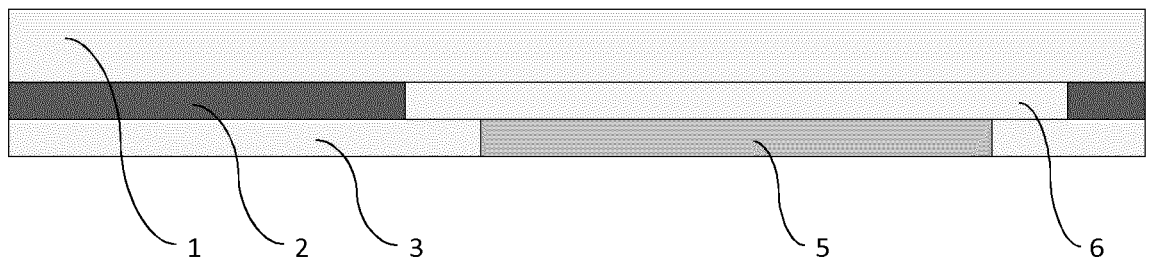
FIGS. 2A to 2C show a composite structure of the present invention, containing a translucent layer (1), an opaque layer (2) containing a translucent area (6), and a sensor layer (3) containing a touch sensor area. Layer (2) may contain a translucent area (6) as a layer portion (FIG. 2A). Layer (2) may be a mask containing a translucent area (6) which is a void area next to opaque parts (FIGS. 2B and 2C).
Figure 2B:
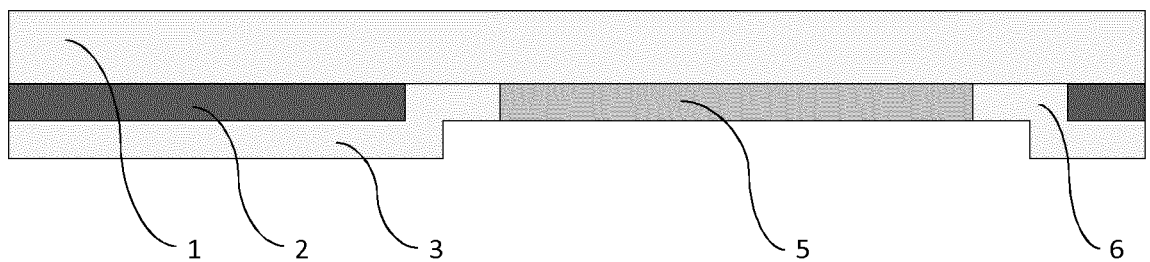
Figure 2C:
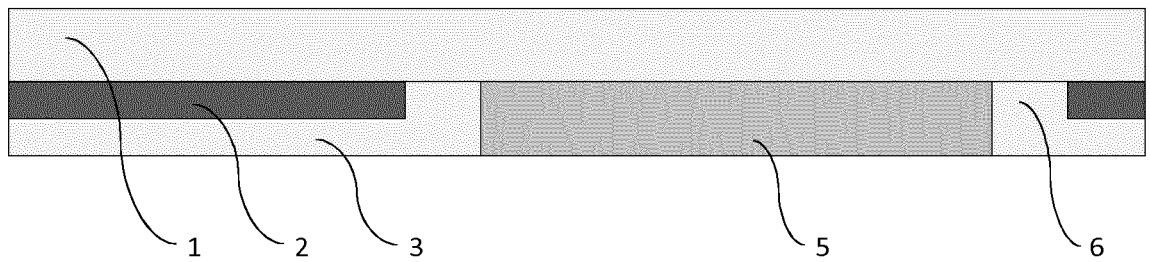
Figure 3A:
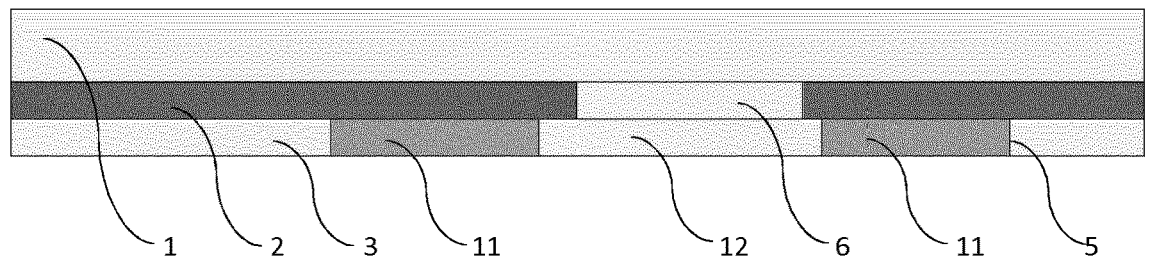
FIGS. 3A to 3C show a composite structure of the present invention, containing a translucent layer (1), an opaque layer (2) containing a translucent area (6), and a sensor layer (3) containing a touch sensor area (5). In this embodiment, a touch sensor (11) encloses a translucent area (12) (see also FIG. 5 for a top view of the touch sensor area (5)). Layer (2) may contain a translucent area (6) as a layer portion (FIG. 3A). Layer (2) may be a mask containing a translucent area (6) which is a void area next to opaque parts (FIGS. 3B and 3C).
Figure 3B:
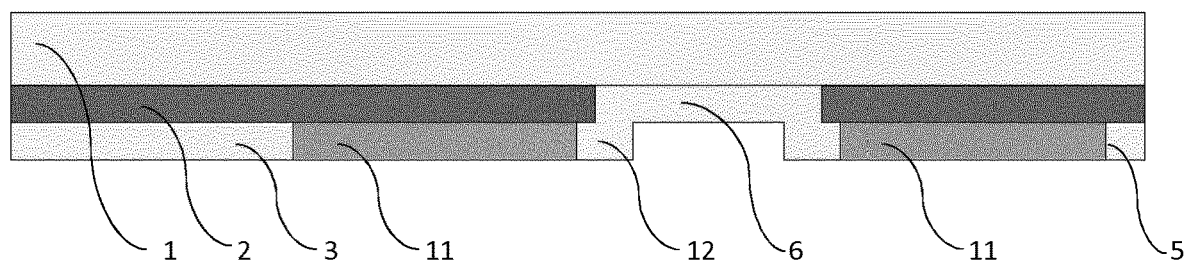
Figure 3C:
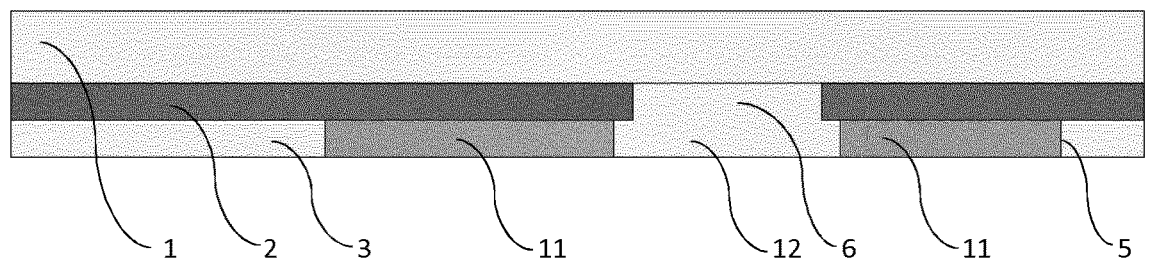
Figure 4:
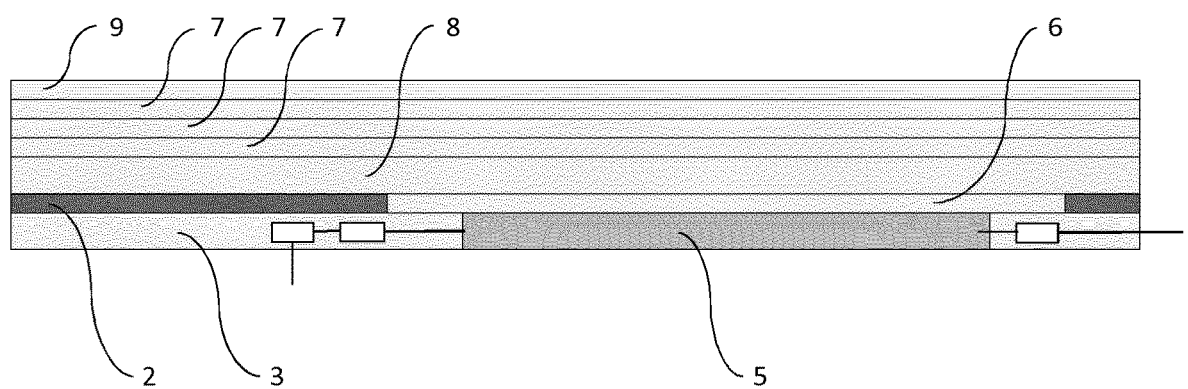
FIG. 4 shows a composite structure of the present invention, containing a lacquer layer (9), a translucent layer (1) comprising three compact layers (7) and a soft layer (8), an opaque layer (2) containing translucent areas (6), and a sensor layer (3) containing a touch sensor area and other electric and electronic elements.

The translucent area (6) may simply be a void area surrounded by an opaque part, i.e. an area where no opaque part is arranged, e. g. a mask. In that case, a structure arranged directly at the B-side of layer (2), e.g. layer (3) and/or a touch sensor area (5), is in direct contact with layer (1) in the translucent area (6) (see FIGS. 2B and 2C).

Layer (2) may also be a film, preferably made of a polymer, that is applied onto another layer. The opaque areas may be provided by dyeing a translucent film with a dye conferring opacity to the dyed areas of the film. In one embodiment, this film may contain the touch sensor area (5) and optionally other electric parts, e.g. those necessary for the touch sensor area to serve its function. This embodiment is an example of the touch sensor area (5) arranged "in" the translucent area of layer (2).

In case the translucent area (6) is not simply a void area, it may be made of the material of layer (2) and may be the area that has not been rendered opaque, e.g. by dyeing. The light transmittance of the translucent area (6) is not limited and may be 1 to 100%, preferably 10 to 90% and more preferably 50 to 90% in the wavelength range of 400 to 700 nm.

The material of layer (2) is not limited. Layer (2) may be made of a compact layer or a soft layer, e.g. a foam layer or any other soft material, e.g. a textile layer. The opaque areas of layer (2) may be dyed, particularly in the case of a foam or a textile.

The material of layer (2) may be a plastisol, which is a suspension of PVC or other polymer particles in a liquid plasticizer. A plastisol flows as a liquid and can be poured into a heated mold. When heated, the plastic particles dissolve and the mixture turns into a gel of high viscosity that usually cannot be poured anymore. On cooling, a flexible and permanently plasticized solid product results. A plastisol can be used as an ink for screen-printing, and is particularly useful for printing opaque graphics. Plastisol inks may be cured.

In one embodiment, layer (2) not only serves the function of providing opaque and translucent areas. Particularly in the case of a touch sensor area (5) being arranged below layer (2), the material of layer (2), which is preferably dyed, may be soft and may thereby contribute to the desired haptics of the composite structure. In that case, the soft material, e.g. a foam or textile, has to be selected to show, in the areas not dyed, suitable light transmittance and other desired properties, e.g. low light scattering and/or visibility or non-visibility of structural elements of the foam or textile upon illumination. In this embodiment, layer (1) may be made of compact layer(s) only, i.e. without having a foam layer or other soft layer.

Touch Sensor Area (5)

The touch sensor area (5) is preferably a sensor sensitive to changes in pressure or temperature or both pressure and temperature. It is preferred that a sensor signal can be affected by the touch of a finger of a human user.

The function of the touch sensor area (5) may be that of a switch or a push button to actuate an electric device such as a lamp or a motor.

The touch sensor area (5) may be a membrane touch switch, which is a momentary electrical on/off switch for activating and de-activating a circuit. Membrane touch switches must be pressed so that its two poles make direct contact to close the circuit. When the membrane touch switch is released, the poles separate and the switch returns to its original open state. Membrane touch switches may be manufactured by printing conductive silver, copper or carbon ink onto a polymer foil. A membrane is applied to the first surface of the switch to obtain a membrane touch switch. Examples of commercially available membrane touch switches are ME602 (DuPont), which is a stretchable silver conductor capable of withstanding thermoforming and overmolding temperatures, or ME774 (DuPont), which is a UV curable crossover dielectric capable of withstanding thermoforming and overmolding temperatures.

The sensor may be a capacitive sensor, and it is preferably a layer sensor. In one embodiment, the sensor is a capacitive layer sensor.

The sensor may be functionally connected to other electric or electronic parts. To that end, the touch sensor area (5) contains elements to connect it to other electric parts. These elements are electric contacts or electric conductors. Therefore, the sensor is preferably contained in a sensor layer (3) that comprises at least electric conductors or contacts.

The touch sensor area (5) is adjusted to respond to pressure differences of preferably 5 g (5 mbar per area of 1 cm$^2$) to 1000 kg (1000 bar per area of 1 cm$^2$) and/or to temperature differences of preferably at least 0.1 K, more preferably at least 0.2 K and most preferably at least 0.5 K.

The touch sensor area (5) may be a capacitive layer sensor comprising a first electrically conductive layer, a ferroelectric polymer, and a second electrically conductive layer in this order.

The electrically conductive layer may be a basic electrode and a cover electrode and may each be made of PEDOT-PSS (PEDOT:PSS: Poly(3,4-ethylenedioxythiophen) polystyrolsulfonat), carbon, silver, aluminum, chromium, gold or copper. A preferred example of electrode materials is PEDOT:PSS having a thickness of about 1 μm. Poly-3,4-ethylendioxythiophen (PEDOT) is an electrically conductive polymer based on thiophene.

The ferroelectric layer may be a copolymer PVDF-TrFE (polyvinylidene fluoride-trifluoro ethylene), which may show strong piezo or pyroelectric activity. (P(VDF:TrFE)=50:50 to 85:15 or 70:30 to 80:20) and have a thickness of about 1 μm. Other examples of the ferroelectric polymer layer a terpolymer of PVDF-TrFE-CFE-oder PVDF-TrFE-CTFE, wherein the molar ratio PVDF:TRFE:CFE is preferably 50-75:20-40:5-10, or PVDF:TRFE:CTFE is preferably 50-75:20-40:5-10. The ferroelectric polymer layer may also be a composite material containing PVDF-TrFE and 5 to 50% by weight of nanoparticles such as $SrTiO_3$, $PbTiO_3$, $PbZrTiO_3$, or $BaTiO_3$.

The following abbreviations are used: PVDF: polyvinylidene fluoride; TrFE: trifluoro ethylene; CFE: chlorofluoro ethylene.

The electric conductor may be copper or silver.

In addition, an electrically conductive adhesive may be used, if necessary.

The touch sensor area (5) is arranged in or above or below the translucent area of layer (2). This means the touch sensor area (5) may be contained in the translucent area of layer (2).

As an alternative, the touch sensor area (5) may be arranged above, i.e. at the A-side, or below, i.e. at the B-side, of layer (2).

The touch sensor area (5) comprises or consists of a touch sensor. Since the touch sensor area may consist of a touch sensor, the two expressions may be used interchangeably in this description.

In one embodiment, the touch sensor area (5) comprises or consists of a translucent touch sensor.

In another embodiment, the touch sensor area (5) contains an optionally opaque touch sensor (11) and a translucent area (12). It is preferred that the optionally opaque touch sensor (11) is fully below, i.e. fully covered by the opaque area of layer (2) and that the translucent area (12) is at least partly in alignment with the translucent area (6) of layer (2). In that case, the touch sensor area (5) preferably contains the translucent area (12) being at least partly in alignment with the translucent area (6) of layer (2) and the optionally opaque touch sensor (11) that is arranged in a horizontal distance of less than 5 mm, more preferably less than 3 mm from the translucent area (6) of layer (2). Alternatively, the optionally opaque touch sensor (11) encloses the translucent area (12) being at least partly in alignment with the translucent area (6) of layer (2) and is arranged in a horizontal distance of less than 5 mm, more preferably less than 3 mm from the translucent area (6) of layer (2).

In the present invention, a structure, e.g. and area or a sensor, which is arranged "in alignment with the translucent area (6)" means that the structure is arranged horizontally such that a light beam can pass the composite structure in a direction perpendicular to the layer plane through said structure and the translucent area (6) of layer (2).

This means the position of the touch sensor area is free in the vertical direction within the composite structure, as long as it is in horizontal alignment with the translucent area of layer (2). In other words, the touch sensor area is at least partly arranged in an area transmitted by light beams that pass the translucent area (6) of layer (2) in vertical direction. Preferably, the touch sensor area (5) is arranged below the translucent layer (1).

Hence, the touch sensor area (5) contained in the composite structure of the present invention is preferably generally defined as a touch sensor area (5), which is at least partly arranged in or above or below the translucent area (6) of layer (2), which comprises a touch sensor (11) that is at least partly arranged in or above or below the translucent area (6) of layer (2) or in a horizontal distance of less than 5 mm, more preferably less than 3 mm from the translucent area (6) of layer (2), and which comprises a translucent area (12) that is at least partly arranged in alignment with the translucent area (6) of layer (2).

In a preferred embodiment of the present invention, the touch sensor area (5) contains a translucent element. The touch sensor area (5) may contain either (i) a translucent touch sensor or (ii) an optionally translucent touch sensor and a translucent area, wherein the translucent element(s) of (i) or (ii) is/are at least partly aligned with the translucent area (6) of layer (2) in a direction perpendicular to the layer plane. In (ii), the translucent area is preferably enclosed by the touch sensor or within a distance of less than 3 mm from said touch sensor.

The arrangement of the touch sensor area (5) is at least partly in or above or below the translucent area of layer (2). Preferably, touch sensor area (5) is in direct contact with the translucent area of layer (2), which means that no other layer or material is present between them.

Layer (2) may be a mask and the touch sensor area may be arranged below the mask. The mask may comprise large and continuous opaque areas, but also small and discontinuous opaque areas, e.g. opaque graphics or symbols. These small opaque areas may be contained in otherwise illuminated areas of layer (2) and may be arranged above the touch sensor area e.g. to draw the user's attention or simplify his orientation.

The touch sensor area (5) may be opaque or translucent. It may also be translucent and contain less translucent or opaque areas such as graphics e.g. to indicate its position or function to the user. These graphics may be part of layer (2).

The Sensor Layer (3)

This layer is an optional feature of the composite structure of the present invention and may simply be referred to as "layer (3)".

Layer (3) comprises the touch sensor area (5) and electric conductors or contacts. It may additionally be connected to or contain elements such as resistors, capacitors, control elements and the like, which are necessary for the touch sensor area (5) to serve its function. These additional elements may be arranged outside or at least partially within the sensor layer (3).

Layer (3) may be applied by inkjet printing of screen printing onto the B-side of layer (1), preferably after layer (2) has been applied to the B-side of layer (1).

Layer (3) may contain the touch sensor area (5) and the other components mentioned in relation to the description of touch sensor area (5). In addition, layer (3) may contain the light source (10). Furthermore, the A-side or B-side of layer (3) may partly be covered by an opaque layer.

Light Source (10)

Light source (10) is an optional feature of the composite structure of the present invention.

Light source (10) serves the purpose of illuminating the translucent areas of the composite structure and to indicate the location of the sensors. Thus, the light source simplifies the user's orientation or draws the user's attention to the illuminated area when the light source is activated.

The light source referred to in the present invention may be a light source arranged at the B-side of the composite structure. The light source may be contained in the composite structure or adhered to the B-side of support layer (4) and may thus be part of the composite structure of the present invention. Alternatively, the light source may be positioned in a distance from the B-side of the composite structure. In that case, the light source is not part of the composite structure of the present invention. In both cases, the beams of light source pass the layers of the composite structure in vertical direction in the following order: translucent area of layer (4); sensor (5) and/or area around it within layer (3); translucent area of layer (2); and layer (1). Therefore, it is essential that the translucent areas and elements are aligned to allow this vertical light transmission through the composite structure.

The light source may be arranged within the composite structure of the present invention, e.g. layer (3) or layer (4). It may or may not be superimposed by the touch sensor area (5). If it is superimposed by the touch layer (5), the light beams emitted from light source (10) pass the layers of the composite structure in vertical direction. If the light source (10) is contained in sensor layer (3) and is not superimposed by the touch layer (5), the light beams emitted from light source (10) pass layer (3) in horizontal direction, e.g. through a light conductor, to illuminate sensor (5) and/or the area around sensor (5). Then, the light beams are deflected, e.g. by means of light scattering elements contained in layer (3), to exit the composite structure in vertical direction.

The technology for the light source is not limited. A broad variety of different technologies can be used as light source used in the present invention and may comprise the following technologies: Light-conducting panels of PMMA or other optically effective polymers that are coupled to one or more LEDs, optionally including edge lighting; polyoptic fibers, for example, of PMMA or glass that are woven, knitted or otherwise processed into fabrics in order to form flexible, ductile room lighting that is subsequently coupled to one or more LEDs; background lighting integrated into the support with integral optical structures that are produced, for example, by means of molding or laser printing, optionally including a reflector and possibly coupled to one or more LEDs; OLEDs, i.e. organic LEDs; electroluminescent components such as films or panels.

The light source (10) may preferably be an LED or an electroluminescence element.

An LED module may be arranged on the B-side of the support layer (4) and coupled to a background lighting device. The LED module and the background lighting device may jointly form the light source (10). The background lighting device may be in the form of a textile layer of PMMA, a light-conducting panel or light-conducting film, a light box or a background lighting device that may be integrated into the support layer (4). The light source may be covered by a light exclusion device on its B-side to prevent light from being emitted by the light source on the B-side of the support layer (4).

A combination of an LED module or another lamp and a background lighting device may serve as light source, wherein the background lighting device may comprise a panel, a film, a textile or a nonwoven structure with light conducting properties, for example of PMMA. A light exclusion device may be provided on the B-side, i.e. on the side of the light source that faces away from the support layer (4), in order to prevent light from being emitted in undesired direction.

The LED may be arranged in the sensor layer (3) and connected to the area to be illuminated via an optical conductor, which may be a transparent foil and may contain a POF (plastic optical fiber).

The LED(s), e.g. Pico-LED(s), or electroluminescence element(s) may have thicknesses of less than 100 μm. The distance from the light source (10) to the touch sensor area (5) is preferably 0.1 to 5 cm.

A light scattering foil having a thickness of e.g. 1 to 30 μm may be used to homogenize and direct the light to the touch sensor area (5).

The area to be illuminated may contain more than one light source (5). For instance, the touch sensor area (5) may have a round shape and several LEDs may be arranged circumferentially around the touch sensor area to draw the user's attention or simplify his orientation.

The Support Layer (4)

This layer is an optional feature of the composite structure of the present invention and may simply be referred to as "layer (4)".

Layer (4) may or may not be translucent, and it may be a flexible and/or soft or a rigid and/or hard material. In one embodiment, layer (4) is transparent, flexible and soft.

It may be made of a fabric, a textile, a spacer fabric or a foam. In particular, layer (4) may be made of a polyolefin foam, a woven spacer fabric, a translucent formed fabric or a translucent knitted fabric. The material and the thickness of the material has to be selected depending on the desired property of the layer, e.g. translucency.

Layer (4) may be made of transparent or semitransparent ABS (acrylonitrile-butadiene-styrene), PP (polypropylene), PC-ABS (polycarbonate ABS) or another suitable material by means of injection molding, press-forming, vacuum molding, blow molding or another suitable process.

In some embodiments, the support layer is translucent only in areas thereof. In examples of this embodiment, a translucent support layer may be provided with an opaque area in an area not to be illuminated, for example, by providing a support layer with an opaque coating or paint layer. In other examples of this embodiment, a cutout is produced in the support layer at the location at which the illuminated area is to be arranged, and a translucent insert is fitted into this cutout. A cutout may be provided, for example, by means of punching, milling, laser cutting or water jet cutting in the region to be illuminated and to replace this cutout with a separate translucent insert. In this case, the support layer component may also be made of a non-transparent material such as, for example, a fiber mat material. The translucent insert may be realized, for example, in the form of an element that consists of PP, ABS, PC-ABS, PMMA (polymethylmethacrylate) or mixtures thereof and is manufactured by means of injection molding or press-forming. The insert covers the region to be illuminated in the finished composite structure. It may be patterned, provided with graphics and/or with optical elements on its B-side and/or on its A-side.

Materials used for the support layer (4) or insert, respectively, may have a light transmittance of about 80% to 95% (for ABS and PMMA) and of 30% to 40% (for PP). Materials used for the translucent layer (1) may have a light transmittance of 10 to 15%, particularly about 12%. A combination of these materials may result in a light transmittance of 5% to 10% for the composite structure.

Layer (4) may be a rigid and/or hard material. Examples of these materials are plastics. These materials may particularly be used in case the layer (4) contains a translucent insert as described above, or in case the light source (5) is contained in the composite structure.

Layer (4) may additionally be provided with a coating, wherein said coating may consist, for example, of a paint or film. It is also possible to dye the support layer (4) itself.

The composite structure comprising layers (1) and (2) and the touch sensor area (5) or layers (1) to (3) may be rigidly connected to the support layer (4) by means of laminating or bonding, e.g. by utilizing an optionally translucent adhesive such as a transparent two-sided adhesive tape, a transparent spray-on adhesive or another transparent adhesive coating.

It is also possible to provide a two-sided adhesive film with different adhesive properties that is, with its one side, permanently or detachably connected to the composite structure comprising layers (1) and (2) and the touch sensor area (5) or layers (1) to (3) and, with its other side, permanently or detachably bonded to the support layer (4).

The Soft Layer (8)

The composite structure of the present invention may contain a soft layer (8) that contributes to the desired softness and haptics of the composite structure. The soft layer may be a foam or a textile.

Preferably, the foam layer has a density of 0.05 to 0.5 g/cm$^3$ or 0.1 to 0.3 g/cm$^3$. The thickness of the foam layer is preferably 30 to 3000 μm or 500 to 2000 μm. The gel fraction of the foam may be 20 to 80% or 30 to 60%. The foam layer may be made of polyolefin, in particular polypropylene.

This soft layer is selected from the group consisting of a soft layer being part of or attached to any one of layers (1) to (4). The soft layer is preferably arranged between layer (1) and layer (2), between layer (2) and layer (3), or between layer (2) or, if present, layer (3) and layer (4).

More preferably, the soft layer is part of layer (1) and arranged below the compact layer structure.

In another preferred embodiment, the soft layer is arranged at the A-side of layer (4), i.e. between layer (2) or, if present, layer (3) and layer (4). In the case of a composite structure having the light source (10) arranged at the B-side of support layer (4), the soft layer is selected to show, at least in the area to be illuminated, suitable light transmittance and other desired properties, e.g. low light scattering and/or visibility or non-visibility of structural elements of the foam or textile upon illumination.

In the case of a composite structure having the light source (10) arranged above layer (4), the soft layer may be opaque. In this embodiment containing the soft layer at the A-side of layer (4), layer (1) may be made of compact layer(s) only, i.e. without having a foam layer or other soft layer. Furthermore, in this embodiment the soft layer may have the desired softness and/or the desired light transmittance only in the area to be illuminated, i.e. the area below the touch sensor area (5). The soft layer may have lower softness and lower light transmittance in other areas.

The composite structure comprising layer (1), layer (2), touch sensor area (5), optionally sensor layer (3), and the soft layer, independent of the position of the soft layer in the composite structure, has a Shore A hardness in the range from 60 to 80.

Example

The present invention will be illustrated by the following example.

Figure 7:
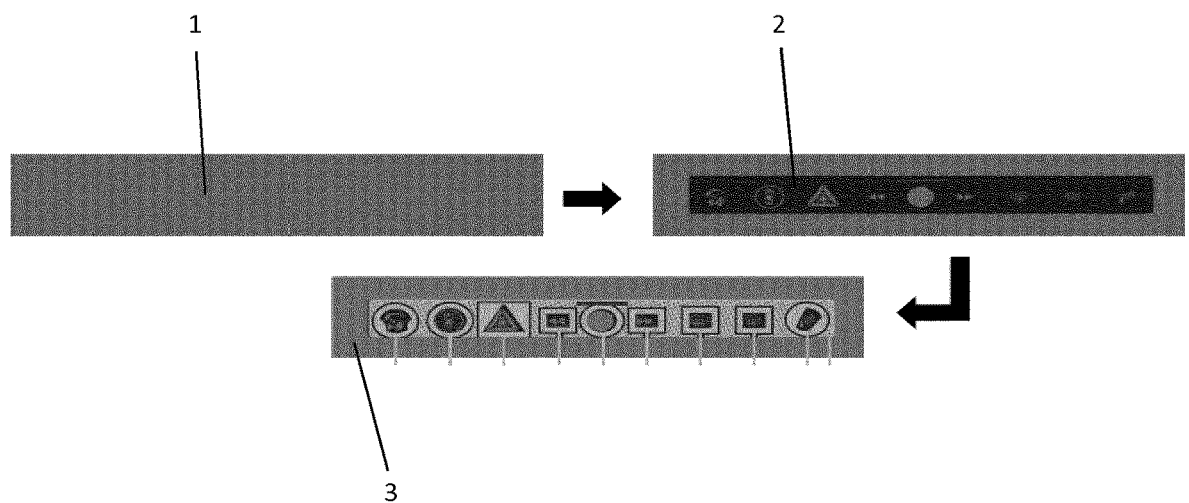
FIG. 7 schematically illustrates the order of the process steps to produce the composite structure illustrated in FIG. 5. In a first step, an opaque mask is screen printed on the translucent foil and, in a second step, capacitive sensors are screen printed on the mask.

A two-step process was carried out to produce a composite structure. In a first step, a black opaque mask of a plastisol was screen printed onto a translucent TPU foil placed on a flat bed to obtain a modified TPU foil, as illustrated in FIG. 7. In a second step, touch sensors were screen printed onto the mask on the modified TPU foil. The touch sensors were commercially available membrane touch switches made of silver (DuPont 5025). The curing was carried out for 10 minutes at 100° C. An electrode and a ground connection were mounted to the composite structure.

Figure 5:
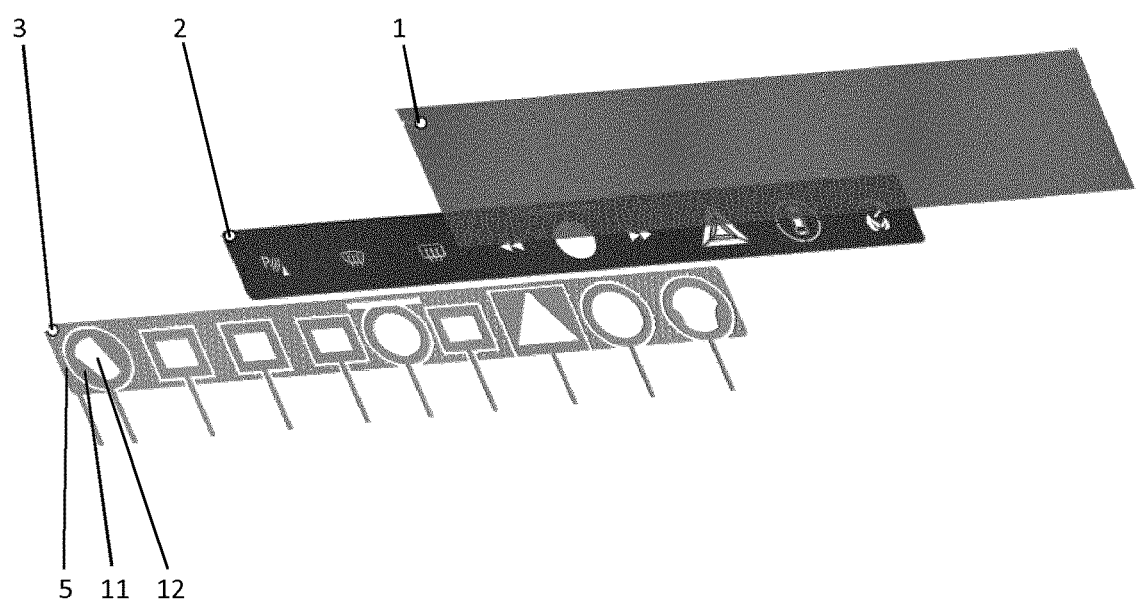
FIG. 5 shows an exploded view of a composite structure of the present invention, containing a translucent TPU foil (1), an opaque screen-printed mask (2) and a sensor layer (3) containing capacitive screen printed touch sensor areas (5).
Figure 6:
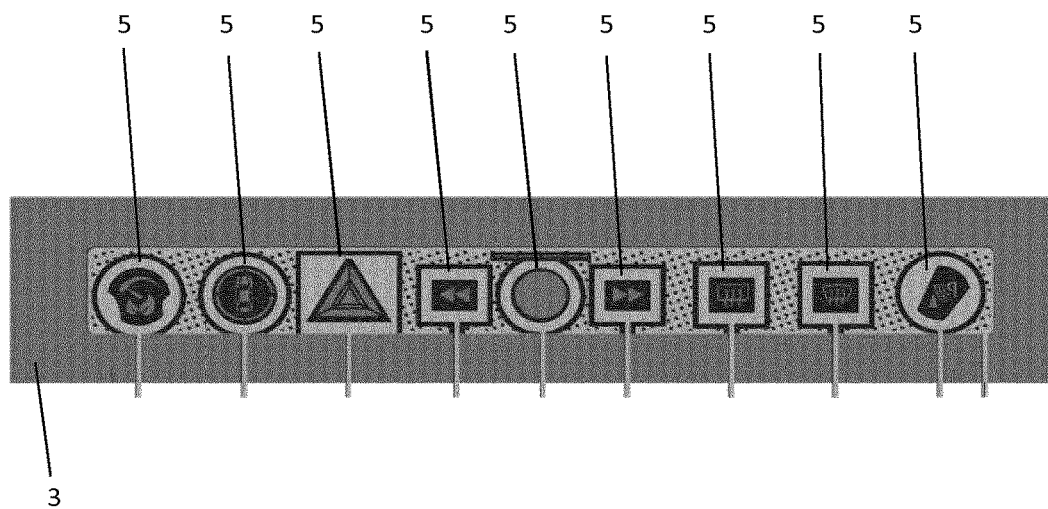
FIG. 6 is a detailed view of the sensor layer (3) of the composite structure illustrated in FIG. 5. The sensor layer (3) contains several sensors to activate different functions.

The composite structure obtained by this process is illustrated in FIG. 5 showing an exploded view of a composite structure.

Figure 8A:
FIGS. 8A and 8B illustrate the hidden-until-lit property of the composite structure shown in FIG. 5. The backlight is deactivated in FIG. 8A, while it is activated in FIG. 8B.
Figure 8B:
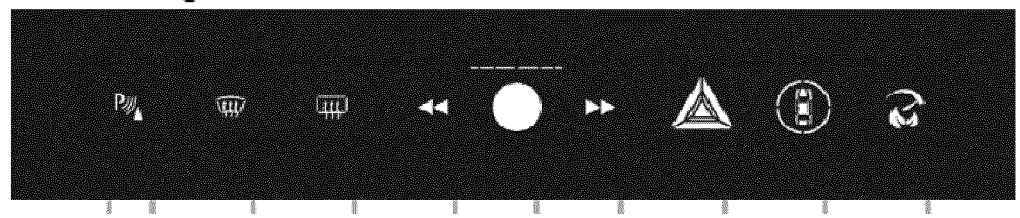
Figure 9A:
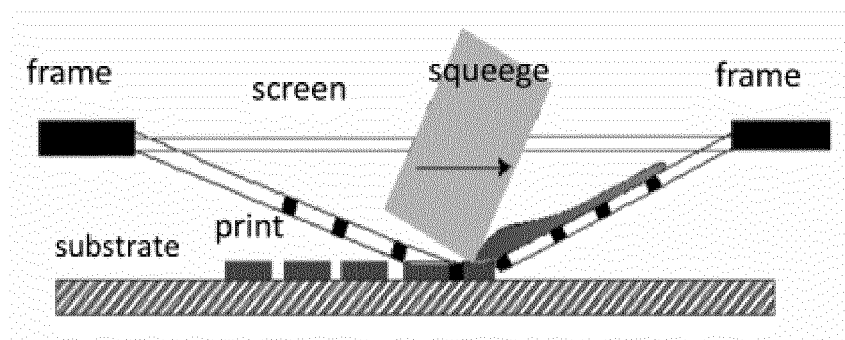
FIGS. 9A and 9B illustrates two screen printing techniques that can be used to screen print the structures of the composite structure of the present invention, e.g. the screen-printed mask and the screen-printed sensors.
Figure 9B:
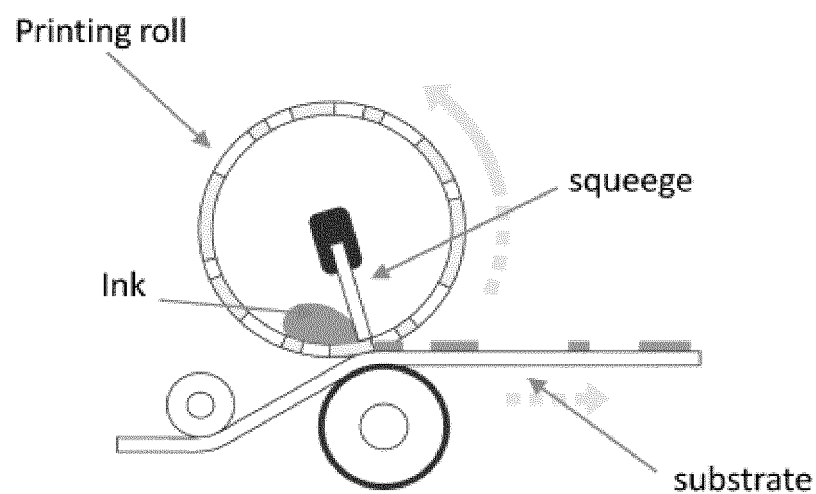

FIGS. 8A and 8B illustrate the advantageous effects of the composite structure, particularly the hidden-until-lit property of the composite structure.

REFERENCE NUMERALS (1) translucent layer
(2) opaque layer containing a translucent area
(3) sensor layer
(4) support layer
(5) touch sensor area
(6) translucent area within opaque layer (2)
(7) compact layer
(8) soft layer
(9) lacquer layer
(10) light source
(11) touch sensor of touch sensor area (5)
(12) translucent area of touch sensor area (5)

What is claimed is:
1. A composite structure comprising, in this order, a translucent layer (1), an opaque layer (2), and a sensor layer (3) comprising a touch sensor area (5) and at least electric conductors connected to the touch sensor area (5):
the translucent layer (1) having a light transmittance of 1 to 50%, wherein the translucent layer (1) or a lacquer layer (9) covering the translucent layer (1) is the uppermost layer of the composite structure;
the opaque layer (2) being arranged below the translucent layer (1), having a thickness of 1 to 100 μm and containing a first translucent area (6), which is a void area surrounded by an opaque area of the opaque layer (2); and the touch sensor area (5) having a thickness of 0.5 to 30 µm, being in direct contact with the translucent layer (1) in the translucent area (6) of the opaque layer (2), and containing a touch sensor (11) fully arranged below the opaque area of the opaque layer (2), and a second translucent area (12) at least partially arranged below the translucent area (6) of the opaque layer (2).

2. The composite structure as recited in claim 1, wherein the opaque layer (2) is a mask layer.

3. The composite structure as recited in claim 1, containing the translucent layer (1), the opaque layer (2), the touch sensor area (5), and a support layer (4) in this order, wherein the support layer (4) is translucent or at least partially translucent.

4. The composite structure as recited in claim 3, containing a light source (10) arranged in or attached to at least one of the layers selected from the opaque layer (2), the sensor layer (3), and the support layer (4).

5. The composite structure as recited in claim 4, wherein the translucent layer (1) is the visible side of the composite structure and is selected to render the other elements of the composite structure invisible in the absence of light emitted from the light source (10) arranged in or at the rear side of the composite structure.

6. The composite structure as recited in claim 5, wherein translucent elements are selected to allow and the opaque areas are selected to inhibit transmittance of visible light emitted from the light source (10) arranged in or at the rear side of the composite structure.

7. The composite structure as recited in claim 3, comprising a soft layer that is contained in the translucent layer (1) below one or more compact layers (7) or that is arranged between the support layer (4) and the sensor layer (3).

8. A process for producing a composite structure as recited in claim 1, comprising a step (i) of applying an opaque layer (2) containing a translucent area (6) on a translucent layer (1) and a subsequent step (ii) of applying a sensor layer (3) containing a touch sensor area (5) on the translucent layer (1).

9. The process as recited in claim 8, wherein the layers are applied by printing in steps (i) and (ii) and the opaque layer (2) containing the translucent area (6) is a mask layer.

10. The process as recited in claim 8, wherein steps (i) and (ii) are each a printing step selected from screen printing and ink jet printing.

11. The process as recited in claim 8, wherein step (i) is printing an opaque mask layer and step (ii) is printing a sensor layer (3).

12. The process as recited in claim 8, comprising a step (a) of applying an opaque layer (2) containing a translucent area on a sensor layer (3) and a step (b) of applying the sensor layer (3) obtained in step (a) on a translucent layer (1).

\* \* \* \* \*